UNITED STATES PATENT OFFICE.

DANIEL E. SOMES, OF WASHINGTON, DISTRICT OF COLUMBIA.

IMPROVEMENT IN COOLING AND PACKING MEAT.

Specification forming part of Letters Patent No. 61,638, dated January 29, 1867.

*To all whom it may concern:*

Be it known that I, DANIEL E. SOMES, of Washington, in the District of Columbia, have invented a new and useful Method of Removing the Animal Heat from Meats, for the purpose of preparing them for preservation; and I do hereby declare the following to be a full and exact description of the same.

It is a well-known fact that before meat can be thoroughly cured the animal heat and gases must be removed. In hot weather, when the carcass of the animal is heated to a high degree, the cooling process should be applied with care, lest the pores of the meat should be closed, thereby preventing the escape of the gases. The sudden introduction of warm meat into packing-houses where ice is freely used causes the surface to be chilled before the heat has had time to escape, causing it to sour near the bone.

In order to obviate this difficulty, and to dispense with the use of ice, I immerse the meat in cool water, and let it remain until the heat is nearly expelled. Cold water or weak brine is then introduced.

To facilitate the operation of cooling I construct tanks or vats and partially fill them with water. The carcasses are introduced into the vats, and allowed to remain till the temperature of the meat and that of the water have become nearly equalized. The water is then let out and cold water or weak brine admitted to complete the cooling process; or a series of vats may be used, and the meat transferred from one to another, the last being colder than the first; or the meat may be put into sluice or stream and be cooled. I also use hose-pipes or their equivalent for conducting water or brine against the meat for the purpose of cooling it.

In a patent already granted to me I claim forcing air through pipes or channels in the earth, by means of a fan, upon meat, thereby expelling the animal heat.

I now propose to force the air through jets of water or spray, which will not only add to the cooling effect, but prevent the air from drying the meat.

A suction-blower or its equivalent attached to a flue whose upper end is near the top of the room in which the meat or any animal or vegetable substance is being cooled, cured, or preserved, will produce rarefaction, and consequently a lower temperature, in the room.

I also conduct water or brine through tubes or pipes in the earth for the purpose of cooling it, and then let it course through vats containing meat to be cooled or cured.

Pumps may be used where the water will not flow without them.

Having thus described my invention, what I claim as new, and desire to secure by Letters Patent, is—

1. Cooling air and liquids, substantially as herein described.
2. Cooling meat, substantially as herein described.
3. Facilitating the salting of meat, substantially as herein described.

D. E. SOMES.

Witnesses:
   J. KIRK SOMES,
   W. H. WHITNEY.